(12) United States Patent
Kang

(10) Patent No.: US 10,707,943 B2
(45) Date of Patent: Jul. 7, 2020

(54) DEVICE FOR ESTIMATING FREQUENCY OFFSETS AND METHOD THEREOF

(71) Applicant: FCI Inc., Seongnam-si, Gyeonggi-do (KR)

(72) Inventor: Byung Su Kang, Seongnam-si (KR)

(73) Assignee: Dialog Semiconductor Korea Inc., Seoul (KR)

(*) Notice: Subject to any disclaimer, the term of this patent is extended or adjusted under 35 U.S.C. 154(b) by 0 days.

(21) Appl. No.: 16/144,513

(22) Filed: Sep. 27, 2018

(65) Prior Publication Data

US 2019/0097711 A1     Mar. 28, 2019

(30) Foreign Application Priority Data

Sep. 27, 2017 (KR) .................. 10-2017-0125586

(51) Int. Cl.
| | |
|---|---|
| *H04B 7/02* | (2018.01) |
| *H04B 7/06* | (2006.01) |
| *H04L 27/26* | (2006.01) |
| *H04L 27/00* | (2006.01) |

(Continued)

(52) U.S. Cl.
CPC ......... *H04B 7/0684* (2013.01); *H04L 5/0048* (2013.01); *H04L 27/0014* (2013.01); *H04L 27/2657* (2013.01); *H04L 27/2672* (2013.01); *H04L 5/0007* (2013.01); *H04L 27/2671* (2013.01); *H04L 27/2675* (2013.01); *H04L 27/2682* (2013.01); *H04L 2027/0026* (2013.01);

(Continued)

(58) Field of Classification Search
CPC . H04B 7/0684; H04L 5/0048; H04L 27/0014; H04L 27/2657; H04L 27/2672; H04L 5/0007; H04L 27/2671; H04L 27/2675; H04L 27/2682; H04L 2027/0026; H04L 2027/0093; H04W 84/12
USPC .......................................................... 375/267
See application file for complete search history.

(56) References Cited

U.S. PATENT DOCUMENTS

| | | | |
|---|---|---|---|
| 5,499,268 A | * | 3/1996 | Takahashi ......... H04L 25/03019 329/307 |
| 6,347,126 B1 | | 2/2002 | Nagayasu et al. |

(Continued)

FOREIGN PATENT DOCUMENTS

CN         1158786 C       7/2004

*Primary Examiner* — Helene E Tayong
(74) *Attorney, Agent, or Firm* — Saile Ackerman LLC; Stephen B. Ackerman

(57) ABSTRACT

A device for estimating frequency offsets which is performed by periodically transmitting training signals from a wireless local area network system. The device includes a processor and computerized codes stored in a storage unit. The processor is configured to execute the computerized code to perform a method. The method includes receiving the plurality of training signals, selecting selected training signals by a predetermined interval from the received training signals, detecting and storing phases of the selected training signals, averaging phase differences of every pair of the detected phases of the selected training signals, calculating the frequency offsets according to an average of the phase differences for every pair of the detected phases of the selected training signals, and calculating a weighted average of the calculated frequency offsets using weighting values for each of the calculated frequency offsets.

10 Claims, 4 Drawing Sheets

(51) Int. Cl.
*H04L 5/00* (2006.01)
*H04W 84/12* (2009.01)

(52) U.S. Cl.
CPC ..... *H04L 2027/0093* (2013.01); *H04W 84/12* (2013.01)

(56) References Cited

U.S. PATENT DOCUMENTS

| | | | | |
|---|---|---|---|---|
| 6,731,710 | B1 * | 5/2004 | Genossar | H04L 27/22 375/226 |
| 7,643,587 | B2 * | 1/2010 | Tanaka | H04B 7/0848 375/316 |
| 8,000,223 | B2 * | 8/2011 | Moorti | H04B 1/7075 370/203 |
| 8,995,588 | B2 * | 3/2015 | Kenney | H04B 1/14 375/344 |
| 9,197,400 | B1 * | 11/2015 | Fang | H04L 27/2657 |
| 9,888,496 | B1 * | 2/2018 | Zheng | H04W 74/0808 |
| 2016/0294584 | A1 * | 10/2016 | Teplitsky | H04L 25/06 |
| 2018/0014216 | A1 * | 1/2018 | Banerjea | H04W 24/08 |

* cited by examiner

DEVICE FOR ESTIMATING FREQUENCY OFFSETS AND METHOD THEREOF

FIELD OF INVENTION

The present disclosure relates to a device for estimating frequency offsets and, particularly, relates to a device for estimating frequency offsets by utilizing short training field (STF) performed in a wireless local area network (WLAN) system.

BACKGROUND OF INVENTION

High speed data encoded by orthogonal frequency division multiplexing (OFDM) will transfer into low speed data and be modulated. The modulated data is transmitted to sub-carriers where each of the sub-barriers is orthogonal to each other.

Inter channel interference (ICI) occurs due to decline of the orthogonality among the sub-carriers when there is an offset between a transmitting end and a receiving end. Thus, amplitudes and phases of transmitted signals become different.

As a result, a wireless local area network (WLAN) system has to estimate frequency offsets within preambles that includes short training field (STF) and long training field (LTF), and then compensates for the frequency offset according to the estimation.

The method for precisely estimating the frequency offset performed by WLAN system disclosed in Korean published patent number 10-2005-0034116 (published on Apr. 14, 2005) and comprises following steps: first, the WLAN system estimates and compensates a coarse frequency offset according to the length of the STF at the transmitting end. Second, estimating a fine frequency offset while applying the estimated coarse frequency offset to compensate the STF. Last, changing the compensating point according to the estimated fine frequency offset. Therefore, delay caused from calculation and compensation of the frequency offset is reduced.

However, the present technology as disclosed by the Korean published patent number 10-2005-0034116 cannot verify the estimation of the frequency offset because only training signals within one specific interval are utilized. Therefore, the estimations are not precise enough.

SUMMARY OF INVENTION

The object of the present disclosure is providing a method for estimating frequency offsets to improve the precision of the estimations of the frequency offset by following steps: estimating several frequency offsets according to training signals within several intervals, determining weighting values for the several estimated frequency offsets, and averaging the estimated frequency offsets applied with weighted values. Therefore, the precision of the estimation of the frequency offsets are improved.

The present disclosure provides a device for estimating frequency offsets, performed by a wireless local area network system to periodically transmit a plurality of training signals. The device comprises a processor and computerized codes stored in a storage unit. The processor is configured to execute the computerized code to perform a method. The method comprises receiving the plurality of training signals by a predetermined period, selecting selected training signals by a predetermined interval from the received training signals, detecting phases of the selected training signals, storing the detected phases of the selected training signals in the storage unit, reading the detected phases stored in the storage unit, averaging phase differences of every pair of the detected phases of the selected training signals, calculating the frequency offsets according to an average of the phase differences for every pair of the detected phases of the selected training signals; and calculating a weighted average of the calculated frequency offsets using weighting values for each of the calculated frequency offsets.

The present disclosure further provides a method for estimating frequency offsets performed by a wireless local area network system to periodically transmit a plurality of training signals. The method comprises receiving the plurality of training signals by a predetermined period, selecting selected training signals by a predetermined interval from the received training signals, detecting phases of the selected training signals, storing the detected phases of the selected training signals in the storage unit, reading the detected phases stored in the storage unit, averaging phase differences of every pair of the detected phases of the selected training signals, calculating the frequency offsets according to an average of the phase differences for every pair of the detected phases of the selected training signals; and calculating a weighted average of the calculated frequency offsets using weighting values for each of the calculated frequency offsets.

The present disclosure provides a more precise compensation in comparison with the present technology by precisely estimating the frequency offset in wireless local network system. As a result, the interferences between the sub-carriers are reduced and the communication performance of the wireless local network system is improved.

DETAILED DESCRIPTION OF PREFERRED EMBODIMENTS

The following context practically introduces parts of embodiments of the present disclosure accompanying with exemplifying drawings. It should be understood that the same reference numbers refer to the same components may be used in different drawings. If structures or functions of a component are well-known will not result in confusion even without any illustration, the detailed introduction will be omitted.

The terms first, second, A, B, (a), (b) are utilized to distinguish different components instead of limiting the arrangements or orders of the embodiments. When components are "comprised" or "included", it means the composition may include components which are not mentioned, that is, the composition is not exclusively composed by the mentioned components. Terms "unit", "module", etc. refer to a component which has at least one function or can deal with at least one process. The component can be a hardware, a software of the combination of hardware and software.

Figure 1:
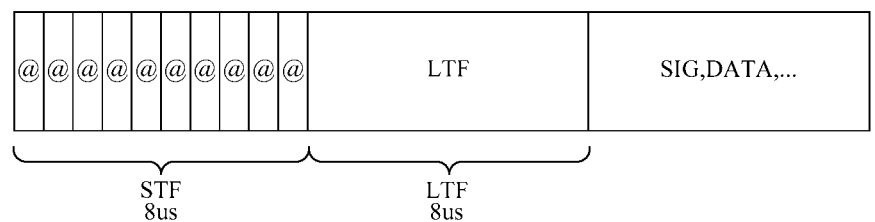
FIG. 1 is a structure of the data packets in wireless local area network.

FIG. 1 illustrates structure of the data packets in wireless local area network.

As shown in FIG. 1, the data packet encoded by orthogonal frequency division multiplexing (OFDM) in wireless local area network (WLAN) system has preamble space before the main data. The preamble comprises short training field (STF) and long training field (LTF). The STF is the first part of the data packet for verifying data packet, automatic gain control, time synchronous, frequency synchronous, etc.

The method to estimate frequency offsets by utilizing SRT is periodically transmit the same signals (hereinafter, "training signals") and estimating frequency offsets according to the intervals and phase shifts of the training signals. When utilizing this method to estimate frequency offset, the accuracy of the estimation is better if the number of the training signals utilized on estimation is higher because the noises and the errors are corrected due to the higher sampling numbers.

In addition, the shorter the intervals between every two adjacent sampling training signals are, the broader the frequency offset range can be estimated, but the estimating accuracy becomes lower. The longer the intervals between every two adjacent sampling training signals are, the narrower the frequency offset range can be estimated, but the estimating accuracy becomes higher.

To conclude, the estimating accuracy of the frequency offset is higher if the number of training signals is higher, or if the intervals between two adjacent sampling training signals are longer.

Figure 2:
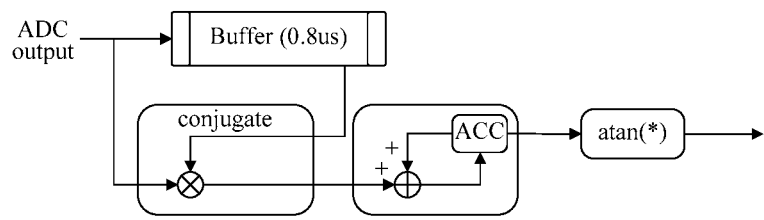
FIG. 2 is a diagram of a method for estimating frequency offsets in wireless local area system of present technology.

FIG. 2 illustrates the diagram of a method for estimating frequency offsets in WLAN system of present technology.

As the method shown in FIG. 2, when the same training signals are periodically transmitted, the receiving end utilizes a 0.8 μs buffer so that the intervals between the training signals are 0.8 μs. Therefore, the receiving end can calculate the phase difference of each pair of the training signals. The accumulated phase difference can be utilized to reduce the noise of signals. The pair of training signals of the present disclosure means two continuous training signals which have specific time interval. Take FIG. 2 as an example, the pair of training signals are the training signals separated by 0.8 μs interval.

After receiving all the training signals, the receiving end obtains an average by dividing the accumulated phase differences by the pair number of training signals, and use the average and arctangent (a tan) function to estimate a frequency offset.

Figure 3:
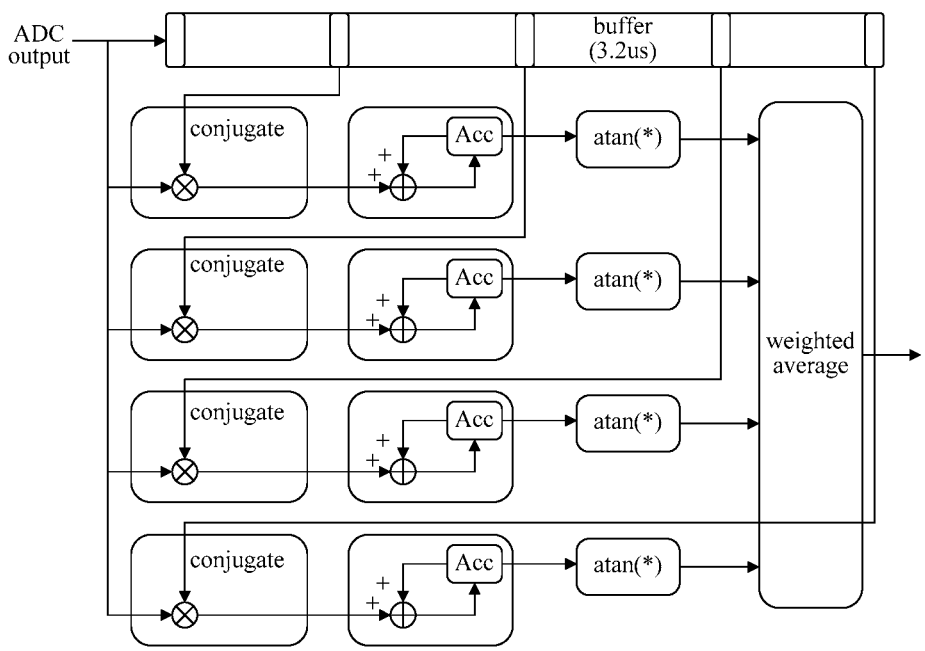
FIG. 3 is a diagram of the method for estimating frequency offsets of the present disclosure.

FIG. 3 illustrates a diagram of a method for estimating frequency offsets of the present disclosure.

The method for estimating frequency offsets of the present disclosure improves the accuracy by adjusting the intervals between each pairs of the training signals with specific number of the training signals.

In the present technology, the same training signals are repeatedly sent with fixed period in the STF space. The receiving end of WLAN system detects the phases of the training signals by predetermined fixed period and stores the phases into storage. The period of sending the training signals and the period of detecting the phase of the training signals are the same so that the frequency offset can be estimated.

Take the period utilized to detecting the phase of the training signals is 0.8 μs as an example, the receiving end of WLAN system detects the phase of the training signals every 0.8 μs and stores the detected phases into storage. In other words, only the training signals which are sent separately by 0.8 μs interval will be used for estimating the frequency offset.

The present disclosure provides a method for estimating frequency offsets by utilizing the training signals which are sent by the integral-multiplicative detecting period in the purposed of improving the accuracy of the estimation of the frequency offset.

For example, the receiving end of the WLAN system detects the phase of the training signals by 0.8 μs interval and stores the phases into storage. Not only the training signals separated by 0.8 μs interval are utilized to estimate frequency offset, but also the training signals separated by 1.6 μs, 2.4 μs or 3.2 μs are utilized to estimate frequency offset.

However, the dilemma is the shorter the time intervals between each pair of training signals are, the potential range of frequency offset which can be estimated is broader. But the longer the time intervals between each pair of training signals are, the potential range of frequency offset which can be estimated is narrower.

For example, when the intervals between each pair of training signals are 0.8 μs, the range of frequency offset that can be estimated is −2.0-2.0. When the intervals between each pair of training signals are 1.6 μs, the range of frequency offset that can be estimated is −1.0-1.0. When the intervals between each pair of training signals are 2.4 μs, the range of frequency offset that can be estimated is −0.67-0.67. When the intervals between each pair of training signals are 3.2 μs, the range of frequency offset that can be estimated is −0.5-0.5. Therefore, how to estimate the frequency offsets which are out of the capable range with the specific detecting intervals becomes a problem in the present technology.

However, even the capable estimating range may change with the length of the time intervals between the training signals, the estimations will still fall within a reasonable range because the estimated frequency offsets, which are out of the reasonable range, can be corrected by correcting the detected phases according to the training signals.

Take frequency offset is 1.2 (without consideration of noise) for example. When the interval between each pair of sampling training signals are 0.8 μs, the possible estimated range of frequency offset is −2-2, therefore the estimated frequency will be 1.2. If the intervals between each pair of sampling training signals are 1.6 μs, the estimated frequency offset is −0.8, and then the corrected frequency offset according to the interval between training signals will fall in 1.2-2.0. If the intervals between each pair of sampling training signals are 2.4 μs, the estimated frequency offset is −0.14, and then the corrected frequency offset according to the interval between training signals will fall in 1.2-1.34. If the intervals between each pair of sampling training signals are 3.2 μs, the estimated frequency offset is 0.2, and then the corrected frequency offset according to the interval between training signals will fall in 1.2-1.0. That is, the estimated frequency offsets can be corrected by utilizing the training signals having 0.8 μs even the longer time intervals are applied when estimating frequency offset.

The time intervals between each pair of training signals can longer than 3.2 μs, such as 4.0 μs or 4.8 μs, when utilizing the method for estimating frequency offsets of present disclosure. However, in order to simplify the description of the specification, the embodiments of the present disclosure will take the intervals of the training signals are 0.8 μs, 1.6 μs, 2.4 μs, and 3.2 μs as example.

If the intervals between the training signals are 0.8 μs, the receiving end calculates the average phase difference of each pair of training signals and stores the calculated average phase difference, and then estimates the frequency offset according to the average phase difference. The estimation is offset_1 when the intervals between each pair of training signals are 0.8 μs.

If the intervals between the training signals are 1.6 μs, the receiving end calculates the average phase difference of each pair of training signals and stores the calculated average phase difference, and then estimates the frequency offset according to the average phase difference. The estimation is offset_2 when the intervals between each pair of training signals are 1.6 μs.

If the intervals between the training signals are 2.4 μs, the receiving end calculates the average phase difference of each pair of training signals and stores the calculated average phase difference, and then estimates the frequency offset according to the average phase difference. The estimation is offset_3 when the intervals between each pair of training signals are 2.4 μs.

If the intervals between the training signals are 3.2 μs, the receiving end calculates the average phase difference of each pair of training signals and stores the calculated average phase difference, and then estimates the frequency offset according to the average phase difference. The estimation is offset_4 when the intervals between each pair of training signals are 3.2 μs.

The receiving end applies different weight value on the frequency offsets offset_1, offset_2, offset_3, and offset_4 estimated with different time intervals of training signals, then calculates the average of weight frequency offsets to obtain the final result of estimated frequency offset.

The weight values are determined depend on to the length of the time intervals and the numbers of the training signals within the time intervals.

For example, if the frequency of the training signals is 40 MHz, and assuming the frequency offset is 3.2 μs. That is, the number of training signals within the interval 3.2 μs is 128. In other words, there are 128 sampling signals within 3.2 μs.

The offset_1 is obtained by the training signals transmitted by 0.8 μs, thus the samples number of signals is 32. Therefore, the number utilized to estimate frequency offset is 96 (128−32=96).

The offset_2 is obtained by the training signals transmitted by 1.6 μs, thus the samples number of signals is 64. Therefore, the number utilized to estimate frequency offset is 96 (128−64=64).

The offset_3 is obtained by the training signals transmitted by 2.4 μs, thus the samples number of signals is 96. Therefore, the number utilized to estimate frequency offset is 96 (128−96=32).

The offset_4 is obtained by the training signals transmitted by 3.2 μs, thus the samples number of signals is 128. Therefore, the number utilized to estimate frequency offset is 96 (128−128=).

The more the number of sampling signals is, or the longer the interval between two sampling signals is, the more precise will the estimated frequency offset will be. In other words, the more the number of the training signals is, or the longer the intervals between each pair of training signals are, the more precise will the estimated frequency offset will be.

The weighted values are positive ratio with the number of the training signals, or the length of the intervals between the training signals. Another way to determine the weight values is transferring the number of the training signals or the length of the intervals between the training signals into algebra, and interpreting the algebra to a function to obtain the weighted values. In the present disclosure, the weighted values are determined by the positive ratio with the number of the training signals, or the length of the intervals between the training signals.

The method of determining weight value is shown as following when the weighted values are determined by the positive ratio.

The weighted value of offset_1 is 1 because the intervals between the training signals are 0.8 μs, which is equal to the detecting intervals (0.8 μs). The number of simples is 96. Therefore, the weighted result of offset_1 is offset_1×96×1.

The weighted value of offset_2 is 1 because the intervals between the training signals are 1.6 μs, which is double to the detecting intervals (0.8 μs). The number of simples is 64 Therefore, the weighted result of offset_1 is offset_2×64×2.

The weighted value of offset_3 is 3 because the intervals between the training signals are 2.4 μs, which is triple to the detecting intervals (0.8 μs). The number of simples is 32. Therefore, the weighted result of offset_1 is offset_3×32×3.

The weighted value of offset_1 is 1 because the intervals between the training signals are 3.2 μs, which is equal to the detecting intervals (0.8 μs). The number of simples is 0. Therefore, the weighted result of offset_1 is offset_4×0×4.

After the receiving end calculates the results of frequency offsets which have applied weighted values, calculating the final result of the frequency offset by utilizing the following formula.

The final estimated frequency offset=(offset_1×96×1+ offset_2×64×2+offset_3×32×3+offset_4×0×4)/(96×1+64× 2+32×3+0×4).

Figure 4:
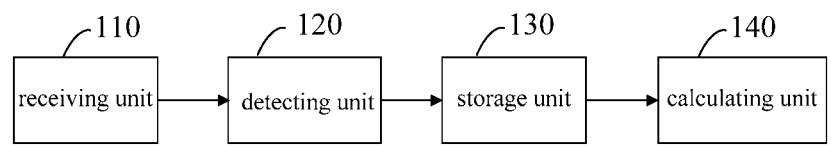
FIG. 4 is a diagram of a device for estimating frequency offsets of the present disclosure.

FIG. 4 illustrates the diagram of a device for estimating frequency offsets of the present disclosure.

A device for estimating frequency offsets of the present disclosure includes receiving unit 110, detecting unit 120, storage unit 130 and calculating unit 140 (i.e. a processor).

A transmitting end of WLAN system sends training signals within STF space repeatedly by the same intervals.

The receiving unit 110 receives the training signals sent by the transmitting unit of WLAN.

The detecting unit 120 periodically detects the phases of the training signals with the same intervals. For example, the interval to detect the phases of the training signals is 0.8 μs. The detecting unit 120 selects selected training signals by 0.8 μs intervals from the training signals received by the receiving unit 110, and then detects the phases of the selected training signals.

The detected phases are stored into storage unit 130. The storage unit can be a memory or a buffer. In the embodiment of the present disclosure, the storage unit 130 is a 0.8 μs buffer.

The calculating unit 140 reads the phase of the selected signals from storage unit 130, and then estimates the frequency offset according to the average of the phase differences between each pair of the selected training signals.

The calculating unit 140 further applies weight values on estimated frequency offsets and obtains the final result of the frequency offset by averaging the weighted estimated frequency offsets.

Preferably, intervals utilized by the calculating unit 140 are integer multipliers of the detecting interval. For example, the detecting interval is 0.8 μs, thus 0.8 μs, 1.6 μs, 2.4 μs, 3.2 μs, etc. are chosen as the sampling interval.

More particularly, after estimating the frequency offsets depend on different time intervals, the calculating unit 140 applies larger weight values on the estimated frequency offsets while the intervals utilized for selecting the selected training signals are longer, and applies larger weight values on the estimated frequency offsets while numbers of the sampling signals with the intervals utilized for estimating are larger.

Figure 5:
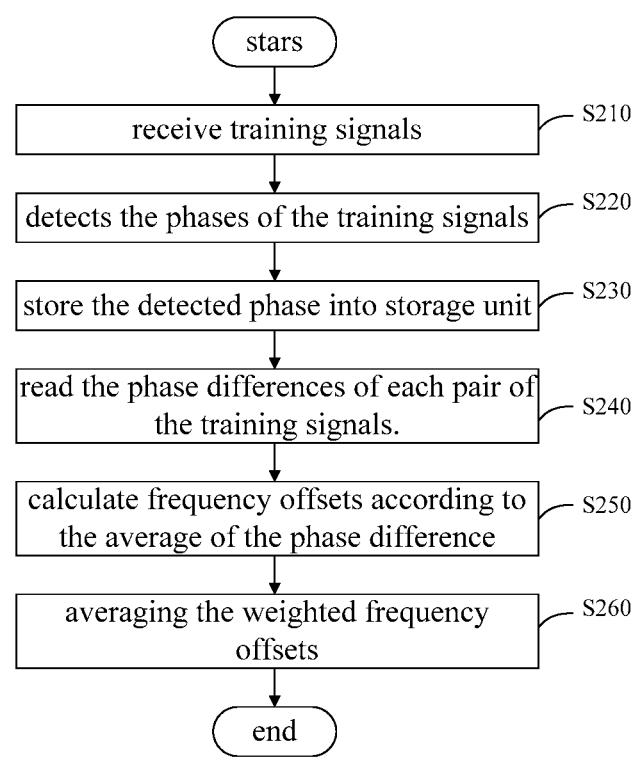
FIG. 5 is a flowchart of the method for estimating frequency offsets at the receiving end of the present disclosure.

FIG. 5 illustrates the flowchart of the method for estimating frequency offsets at the receiving end of the present disclosure.

The method for estimating frequency offsets of the present include receiving process S210, detecting process S220, storing process S230, reading process S240, calculating process of phase differences S250, and calculating process of weighted average S260.

The transmitting end of the WLAN system periodically transmits the same training signals by specific time intervals in STF.

The receiving end receives the training signals transmitted by the WLAN system (S210).

The receiving end selects selected training signals from received training signals and by a specific interval detects the phases of the selected training signals (S220). For example, the receiving end detects the phases of the training signals by the 0.8 µs.

The receiving end further stores the detected phases into a storage unit within the receiving end (S230). The storage unit can be a memory or a buffer. For example, the storage unit of the embodiment of present disclosure is a 0.8 µs buffer.

The receiving end read the phase differences between each pair of training signals with several different time intervals (S240). The pair of training signals means two continuous selected training signals which intervals are the specific time interval. Take 0.8 µs as an example, the pair of training signals means two signals separated by 0.8 µs interval. Estimating the frequency offset by averaging the phase difference (S250).

The receiving end applies different weight values on the estimated frequency offsets depend on the sampling time intervals, and obtains the final result of the frequency offset by averaging the weighted estimated frequency offset (S260).

Preferably, intervals utilized to samples the training signals are integer multipliers of the detecting interval. For example, the detecting interval is 0.8 µs, thus 0.8 µs, 1.6 µs, 2.4 µs, 3.2 µs, etc. are chosen as the sampling interval.

The receiving end determines the weight values applied on the estimated frequency offsets according to the lengths of intervals utilized for sampling, or according to numbers of the sampling signals with the intervals.

More particularly, the receiving end applies larger weight values on the estimated frequency offsets while the intervals utilized for sampling are longer, and applies larger weight values on the estimated frequency offsets while numbers of the sampling signals with the intervals are larger.

The processes S210-S260 are executed in sequence as shown in FIG. 5. However, the method illustrated by FIG. 5 is not limited to the sequence from S210 to S260. And modification or variation of the technical features that a skilled person in the art can obtain by simply changing the sequence of S210-S260, omitting at least one process of S210-S260, or simultaneously operating at least two processes of S210-S260 will fall into the scope protected by the present disclosure.

Besides, the above-mentioned embodiment can be implemented by codes store in the record media of computers or smart phones. The record media of computers or smart phone can be magnetic storage (such as read only memory (ROM), software, hardware, etc.), optical disc storage media (such as compact disc-read only memory (CD-ROM), digital versatile disc (DVD)), flash memory (such as universal serial bus (USB) flash drive, solid state drive (SSD)), etc. In addition, the execute codes can be separately store in difference component of computers or smart phones which are connected with internet.

Figure 6:
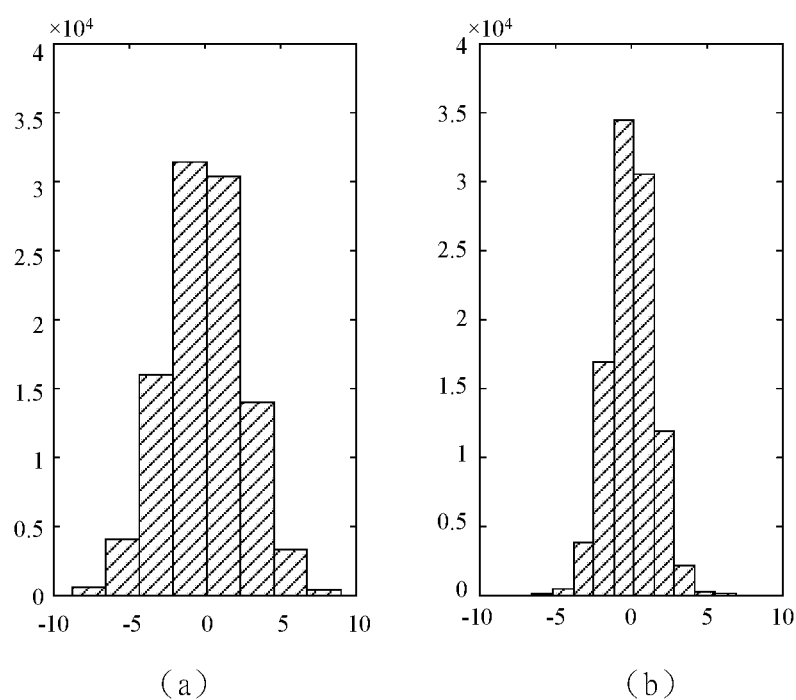
FIG. 6 are comparison probability distributions of frequency offsets which are estimated by the present technology and the present disclosure.

FIG. 6 illustrates comparison probability distribution of frequency offsets which are estimated by the present technology and the present disclosure. The results as shown in FIG. 6 come out with the signals which actual frequency offset is 0, signal to noise ratio (SNR) is 6 dB, and the sampling interval is 4.25 µs.

FIG. 6 (a) shows the estimation of the present technology. FIG. 6(b) shows the estimation of the present disclosure. From the comparison charts of FIG. 6(a) and FIG. 6(b), the accuracy of the present disclosure is more precise than the present technology because the estimated frequency offset of the former is closer to 0 than the later.

The dispersion of the estimated frequency offsets of the present technology is 6.4182 which the dispersion of the estimated frequency offsets is 2.0482. Obviously, the estimating ability of the present disclosure is extremely excellent.

To conclude, the above-mentioned embodiments are utilized to exemplify rather than limit the technology concept of the present disclosure. Any modification and variation which can be completed by a skilled person in the art on the basis of the specification should fall into the scope of the claims protected by the present disclosure.

What is claimed is:

1. A device for estimating frequency offsets, performed by a wireless local area network system to periodically transmit a plurality of training signals, the device comprising a processor and computerized codes stored in a storage unit, the processor configured to execute the computerized code to perform a method, the method, comprising:
receiving the plurality of training signals by a predetermined period;
selecting selected training signals by a predetermined interval from the received training signals;
detecting phases of the selected training signals;
storing the detected phases of the selected training signals in the storage unit;
reading the detected phases stored in the storage unit;
averaging phase differences of every pair of the detected phases of the selected training signals;
calculating the frequency offsets according to an average of the phase differences for every pair of the detected phases of the selected training signals; and
calculating a weighted average of the calculated frequency offsets using weighting values for each of the calculated frequency offsets,
wherein the weighting values are determined depending on a length of the predetermined intervals.

2. The device for estimating frequency offsets according to claim 1, wherein each of the predetermined intervals is integer multiples of the predetermined period.

3. The device for estimating frequency offsets according to claim 1, wherein the longer the predetermined intervals are, the greater the weighting values are.

4. The device for estimating frequency offsets according to claim 1, wherein the weighting values are determined according to a number of the selected training signals.

5. The device for estimating frequency offsets according to claim 4, wherein the larger the number of the selected training signals is, the greater the weighting values are.

6. A method for estimating frequency offsets performed by a wireless local area network system to periodically transmit a plurality of training signals, comprising:
    receiving the plurality of training signals by a predetermined period;
    selecting selected training signals by a predetermined interval from the received training signals;
    detecting phases of the selected training signals;
    storing the detected phases of the selected training signals in a storage unit;
    reading the detected phases stored in the storage unit;
    averaging phase differences of every pair of the detected phases of the selected training signals;
    calculating the frequency offsets according to an average of the phase differences for every pair of the detected phases of the selected training signals; and
    calculating a weighted average of the calculated frequency offsets using weighting values for each of the calculated frequency offsets,
    wherein the weighting values are determined depending on a length of the predetermined intervals.

7. The method for estimating frequency offsets according to claim 6, wherein each of the predetermined intervals is integer multiples of the predetermined period.

8. The method for estimating frequency offsets according to claim 6, wherein the longer predetermined intervals are, the greater the weighting values are.

9. The method for estimating frequency offsets according to claim 6, wherein the weighting values are determined according to a number of the selected training signals.

10. The method for estimating frequency offsets according to claim 9, wherein the larger the number of the selected training signals is, the greater the weighting values are.

* * * * *